United States Patent
Yamamoto

(10) Patent No.: US 7,826,312 B2
(45) Date of Patent: Nov. 2, 2010

(54) OPTICAL DISC APPARATUS AND CONTROL METHOD FOR OPTICAL DISC APPARATUS

(75) Inventor: Norikazu Yamamoto, Chiba (JP)

(73) Assignee: Sony Corporation, Tokyo (JP)

( * ) Notice: Subject to any disclaimer, the term of this patent is extended or adjusted under 35 U.S.C. 154(b) by 638 days.

(21) Appl. No.: 11/820,748

(22) Filed: Jun. 20, 2007

(65) Prior Publication Data

US 2008/0002537 A1    Jan. 3, 2008

(30) Foreign Application Priority Data

Jun. 30, 2006    (JP)    ............... 2006-182211

(51) Int. Cl.
*G11B 7/085*    (2006.01)
(52) U.S. Cl. ............... 369/30.16; 369/44.27; 369/44.25
(58) Field of Classification Search ............. 369/44.27, 369/44.25, 30.16; 720/659, 660, 671, 672, 720/673, 674
See application file for complete search history.

(56) References Cited

U.S. PATENT DOCUMENTS

| 7,106,668 B2* | 9/2006 | Okada et al. ............. 369/30.27 |
| 2007/0050797 A1* | 3/2007 | Inoue et al. ................. 720/671 |

FOREIGN PATENT DOCUMENTS

| JP | 08-096533 A | 4/1996 |
| JP | 2003-281745 A | 10/2003 |
| JP | 2005-141801 A | 6/2005 |
| JP | 2005-293647 A | 10/2005 |
| JP | 2006-107613 A | 4/2006 |

* cited by examiner

*Primary Examiner*—Wayne R Young
*Assistant Examiner*—Brenda Bernardi
(74) *Attorney, Agent, or Firm*—Wolf, Greenfield & Sacks, P.C.

(57) ABSTRACT

An optical disc apparatus includes: an optical pickup; a sled drive section that moves the optical pickup in a radial direction of an optical disc; and position control means for controlling, after bringing the optical pickup to an end of a moving range of the sled drive section, the sled drive section to move the optical pickup a predetermined distance in the opposite direction to place the optical pickup at a predetermined reference position.

8 Claims, 5 Drawing Sheets

OPTICAL DISC APPARATUS AND CONTROL METHOD FOR OPTICAL DISC APPARATUS

CROSS REFERENCES TO RELATED APPLICATIONS

The present invention contains subject matter related to Japanese Patent Application JP2006-182211 filed in the Japanese Patent Office on Jun. 30, 2006, the entire contents of which being incorporated herein by reference.

BACKGROUND OF THE INVENTION

1. Field of the Invention

The present invention relates to an optical disc apparatus and control method for optical disc apparatus, and is preferably used to control the position of an optical pickup, for example.

2. Description of Related Art

Generally, an optical disc apparatus performs an initial operation after an optical disc is inserted: the optical disc apparatus moves an optical pickup to a read-in area, which is located at the innermost circumference of the optical disc. Based on the information from the read-in area, the optical disc apparatus checks the type of the optical disc or the content recorded on the optical disc to start reproducing or recording information on the optical disc.

It is desirable that the optical disc apparatus appropriately moves the optical pickup onto the read-in area. However, the optical disc apparatus has difficulty in recognizing the position of the optical disc when the initial operation is started because the information, such as the address information of the optical disc, is not read from the optical disc yet.

Accordingly, the optical disc apparatus is typically equipped with position detection means, such as a limit switch, inside an area where the optical pickup moves, to detect the position of the optical pickup. This allows the optical disc apparatus to appropriately bring the optical pickup in the read-in area during the initial operation.

In recent years, there is a demand that the optical disc apparatus be downsized and simplified. For example, Patent Document 1 (Jpn. Pat. Laid-open Publication No. 2005-141801) discloses an optical disc apparatus which does not have any position detection means: this apparatus has storage means to store the position information of the optical pickup when the optical disc is ejected. Accordingly, the optical disc apparatus can recognize, when performing the initial operation after the optical disc is inserted, the current position of the optical pickup.

SUMMARY OF THE INVENTION

However, the optical disc apparatus, not including any position detection means, does not have any position information in the storage means when the optical disc apparatus is for the first time connected to an electric power supply after being purchased. As a result, the optical disc apparatus may not be able to recognize the current position of the optical pickup.

The present invention has been made in view of the above points and is intended to provide an optical disc apparatus and control method thereof, which can appropriately reproduce and record information on the optical disc with simple configuration.

In one aspect of the present invention, an optical disc apparatus includes: an optical pickup; a sled drive section that moves the optical pickup in a radial direction of an optical disc; and position control means for controlling, after bringing the optical pickup to an end of a moving range of the sled drive section, the sled drive section to move the optical pickup a predetermined distance in the opposite direction to place the optical pickup at a predetermined reference position.

In this manner, the optical disc apparatus moves, after bringing the optical pickup to the end of the moving range, the optical pickup the predetermined distance in the opposite direction. Accordingly, the optical disc apparatus can appropriately place the optical pickup at the reference position without using the position detection means of the optical pickup even if the apparatus could not detect the current position of the optical pickup.

In another aspect of the present invention, a control method of an optical disc apparatus includes: a first step of bringing an optical pickup to an end of a moving range of a sled drive section; and a second step of moving the optical pickup a predetermined distance in a direction opposed to the direction of the first step to place the optical pickup at a predetermined reference position.

In this manner, the optical disc apparatus moves, after bringing the optical pickup to the end of the moving range, the optical pickup the predetermined distance in the opposite direction. Accordingly, the optical disc apparatus can appropriately place the optical pickup at the reference position without using the position detection means of the optical pickup even if the apparatus could not detect the current position of the optical pickup.

As mentioned above, the optical disc apparatus according to an embodiment of the present invention moves, after bringing the optical pickup to the end of the moving range, the optical pickup the predetermined distance in the opposite direction. Accordingly, the optical disc apparatus can appropriately place the optical pickup at the reference position without using the position detection means of the optical pickup even if the apparatus could not detect the current position of the optical pickup. Thus, the configuration of the optical disc apparatus that records and reproduces information from the optical disc can be simplified.

The nature, principle and utility of the invention will become more apparent from the following detailed description when read in conjunction with the accompanying drawings in which like parts are designate by like reference numerals or characters.

DETAILED DESCRIPTION OF PREFERRED EMBODIMENTS

An embodiment of the present invention will be described in detail with reference to the accompanying drawings.

(1) Overall Configuration of Optical Disc Apparatus

Figure 1:
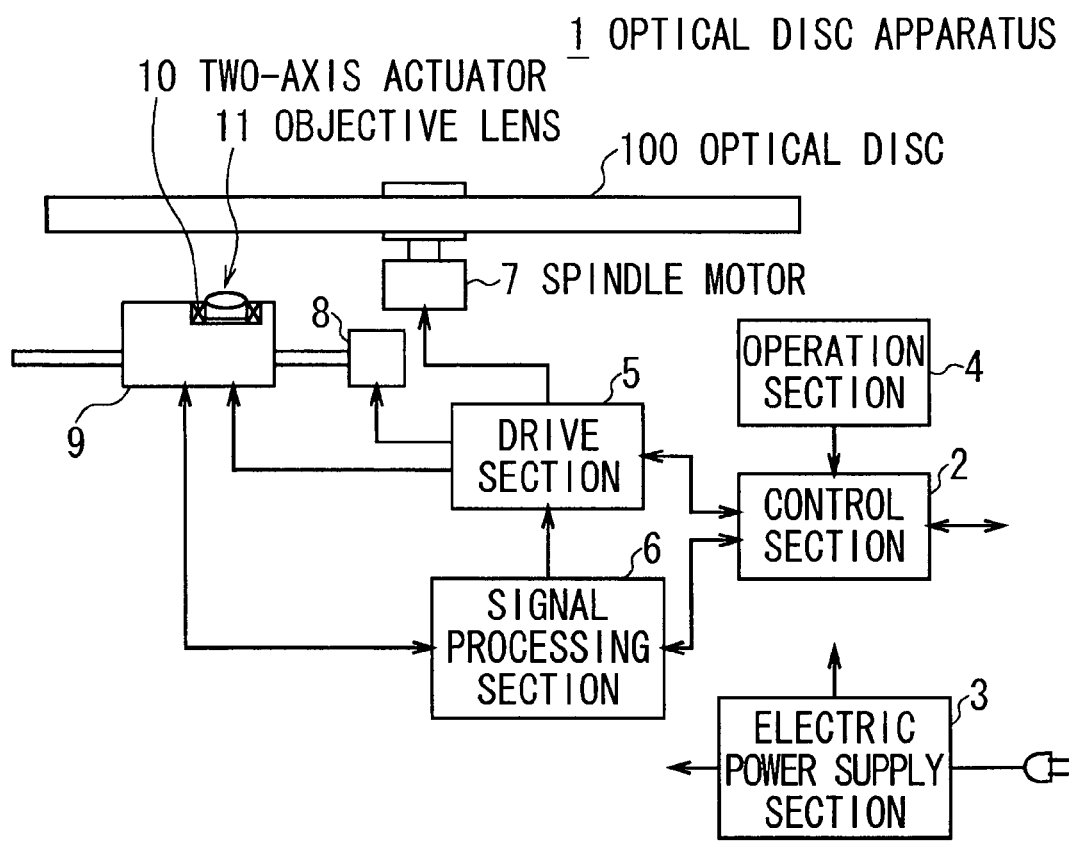
FIG. 1 is a schematic diagram illustrating the overall configuration of an optical disc apparatus.

In FIG. 1, the reference numeral 1 denotes an optical disc apparatus according to an embodiment of the present invention. The optical disc apparatus 1, under the control of a control section 2, operates by power supplied from an electric power supply section 3.

The electric power supply section 3 transforms and rectifies the voltage from an electrical outlet to which the electric power supply section 3 is connected, and then supplies it to each component of the optical disc apparatus 1. When the control section 2 receives a reproduction command from an operation section 4 after an optical disc 100 is inserted, the control section 2 controls, in accordance with the reproduction command, a drive section 5 and a signal processing section 6 to reproduce information from the optical disc 100.

The drive section 5, under the control of the control section 2, controls a spindle motor 7 to rotate the optical disc 100 at an appropriate speed. In addition, a sled motor 8 (or a stepping motor) moves an optical pickup 9 in a tracking direction, or in a radial direction of the optical disc 100. Furthermore, an two-axis actuator 10 moves an objective lens 11 in a focus direction and a tracking direction.

At the same time, the signal processing section 6 controls the optical pickup 9 to emit a predetermined optical beam through the objective lens 11 to a recording surface of the optical disc 100. The signal processing section 6 detects the reflection to generate a reproduction signal, and outputs it through the control section 2 to external sections.

The optical disc apparatus 1 supports two types of optical disc: Digital Versatile Disc (DVD) and Compact Disc (CD). The optical pickup 9 emits the optical beam whose wavelength is suitable for the type of the optical disc 100 inserted. The objective lens 11 collects the optical beam to focus it on the recording surface of the optical disc 100. Light receiving elements (not shown) receives the optical beam, reflected on the recording surface, through the objective lens 11 and photo-electrically converts it into detection signals which are then supplied to the signal processing section 6.

Based on the focus error signals or tracking error signals supplied from the signal processing section 6, the drive section 5 moves the two-axis actuator 10. The signal processing section 6 performs a predetermined signal process on the reproduction signal supplied from the optical pickup 9, and then outputs it through the control section 2 to external sections.

Figure 2:
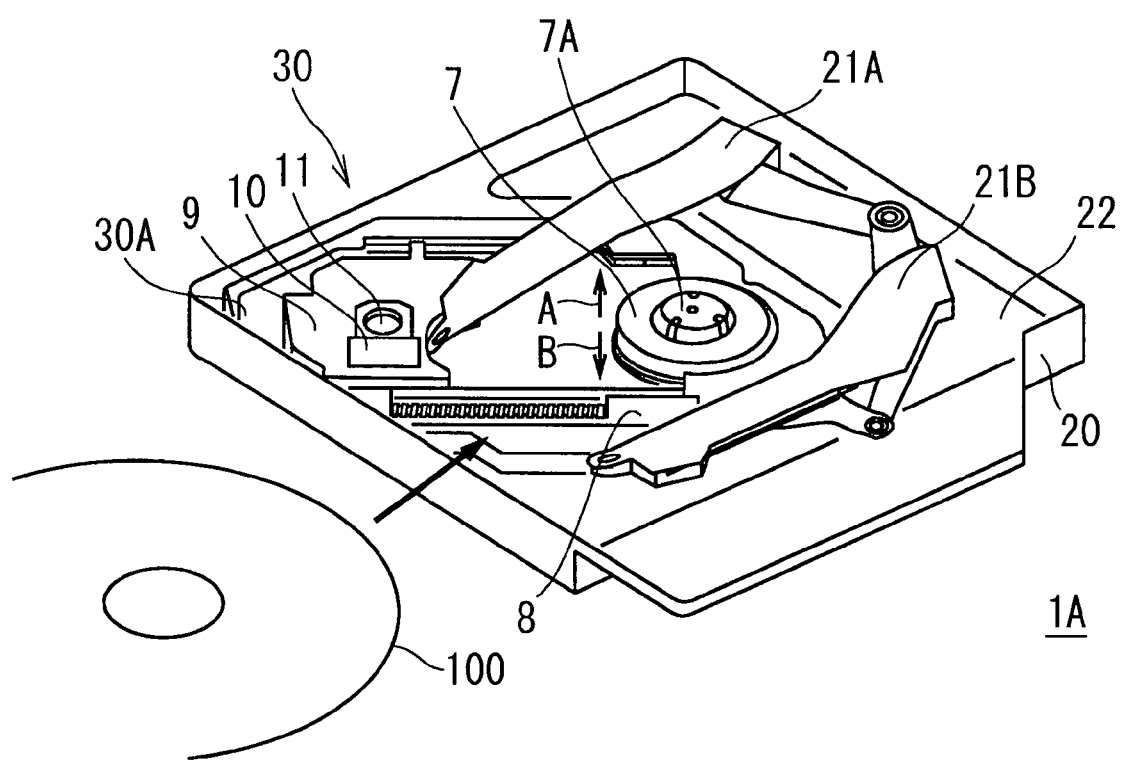
FIG. 2 is a schematic diagram illustrating an appearance of the optical disc apparatus.

FIG. 2 shows a drive unit 1A of the optical disc apparatus 1, which drives the optical disc as well as recording and reading information from the optical disc. The drive unit 1A has a housing 20, which is a flat box. An arm drive section 22 is attached to the inside of the housing 20. The arm drive section 22 moves disc holding arms 21A and 21B to help the optical disc 100 to be inserted and ejected. In addition, at the center of the housing 200 is a base unit 30 where the optical disc 100 is driven for recording and reproducing.

The arm drive section 22 opens and closes the disc holding arms 21A and 21B along with sub arms (not shown): the disc holding arms 21A and 21B, when the optical disc 100 is inserted, lead and hold the optical disc 100 at an appropriate position on the base unit 30, while the disc holding arms 21A and 21B, when the optical disc 100 is ejected, push the optical disc 100 toward the outside of the optical disc apparatus 1.

On the base unit 30 are mounted the spindle motor 7, the sled motor 8 and the optical pickup 9. The base unit 30 includes a drive device (not shown) whose rotation center is an edge section 30A to push up and down a chuck 7A in a direction A (indicated by an arrow A) or the opposite direction B (indicated by an arrow B).

When the optical disc 100 is inserted or ejected the optical disc apparatus 1 pushes down the chuck 7A in the direction B to prevent contact with the optical disc 100. When the optical disc 100 inserted is held by the disc holding arms 21A and 21B at the appropriate position, the chuck 71 is pushed up in the direction A and inserted into a center hole of the optical disc 100. After that, the spindle motor 7 rotates the optical disc 100 held by the chuck 7A.

(2) Configuration of the Base Unit

Figure 3:
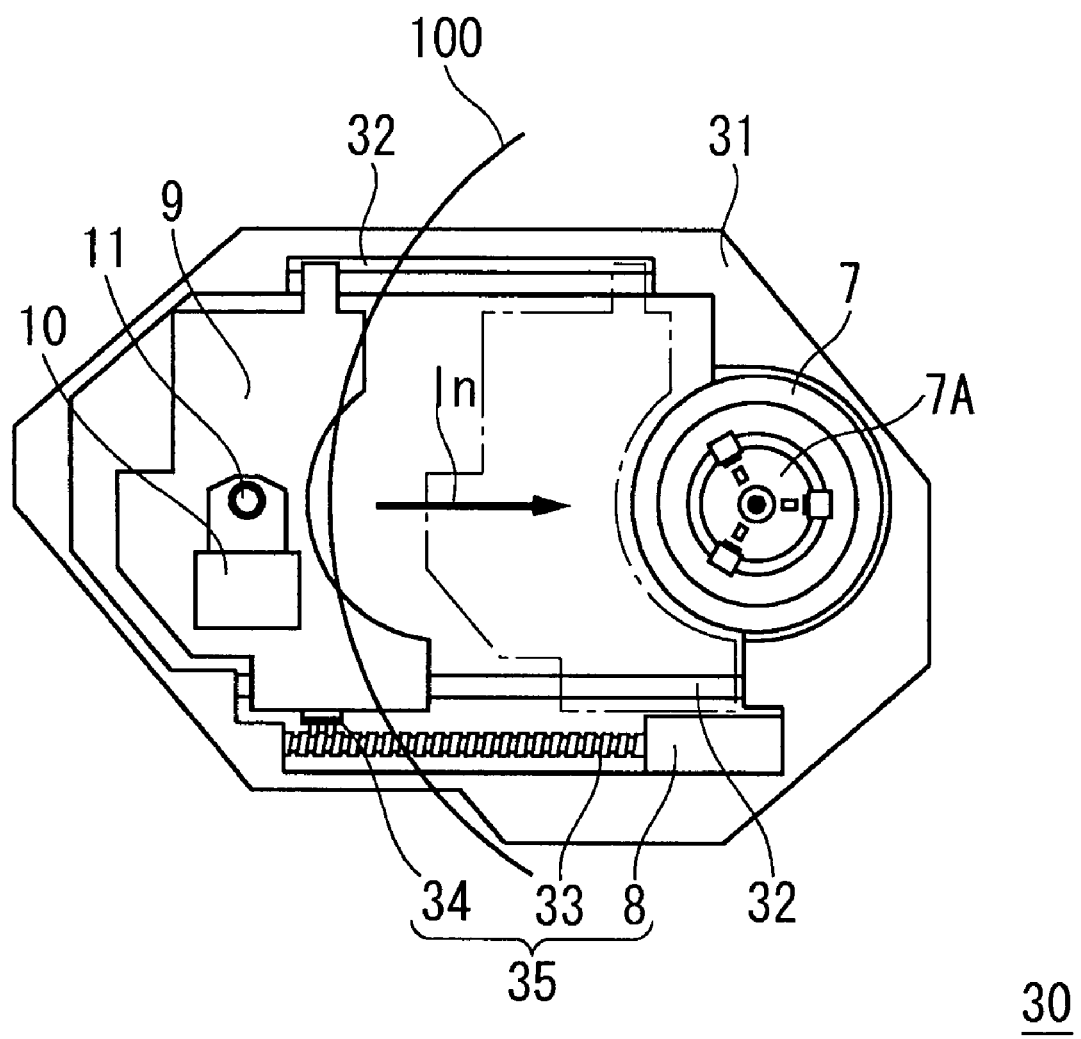
FIG. 3 is a schematic diagram illustrating the configuration of a base unit.

FIG. 3 shows the configuration of the base unit 30. The base unit 30 has a frame 31. At the center of the frame 31 is an opening section. The spindle motor 7 is mounted on an edge of the frame 31. A pair of guide shafts 32 is mounted on the frame 31 along the longitudinal direction of the opening section, being aligned with the radial direction of the optical disc 100.

The optical pickup 9 has guide holes (not shown) into which the guide shafts 32 are inserted, allowing the optical pickup 9 to slide along the guide shafts 32. As a result, the optical pickup 9 can move toward the inner circumference of the optical disc 100 (or in a direction indicated by an arrow In) and the outer circumference of the optical disc 100 (or in the opposite direction).

A feed screw 33, directly connected to the sled motor 8, is mounted on the base unit 30 along the guide shafts 32 such that it is rotatable. The optical pickup 9 has a feed click 34 which is toothed with the groove of the feed screw 33. Accordingly, a sled drive section 35, including the sled motor 8, the feed screw 33 and the feed click 34, can move the optical pickup 9 toward the inner or outer circumference of the optical disc 100 by rotating the feed screw 33.

When being looked from the output axis of the sled motor 8 the clockwise rotation of the sled motor 8 moves the optical pickup 9 toward the inner circumference, while the counter-clockwise rotation of the sled motor 8 moves the optical pickup 9 toward the outer circumference. The clockwise rotation of the sled motor 8 is also referred to as an "inner rotation", while the counterclockwise rotation is also referred to as an "outer rotation".

The feed click 34 is pressed by a pressing spring (not shown) into the feed screw 33 with a predetermined pushing pressure. When the optical pickup 9 slides to the innermost or the outermost area extra pressure may be applied to the sled drive section 35. In this case, the feed click 34 drops from the feed screw 33 to prevent the wreck of the sled drive section 35.

Figure 4A:
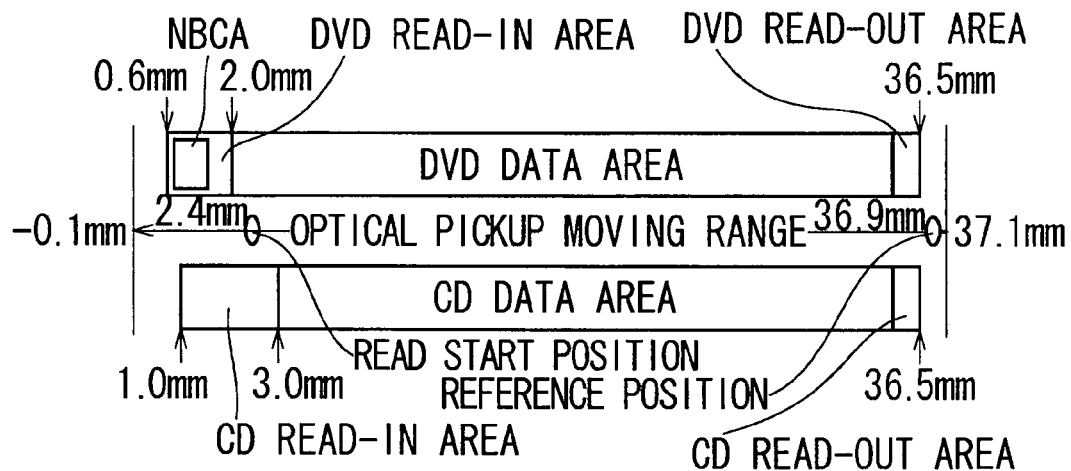
FIGS. 4A to 4C are schematic diagrams illustrating the relationship between the position of an optical pickup and a format of an optical disc.

FIG. 4A illustrates the moving range of the optical pickup 9, along with a format of the recording area of CD and DVD. The moving range extends from the innermost point of −0.1 mm to the outermost point of 37.1 mm. That is, the moving range is 37.2 mm. Compared to the moving range of the optical pickup 9, the recording area of CD extends from 1.0 mm to 36.5 mm while the recording area of DVD extends from 0.6 mm to 36.5 mm.

A reference position of the optical pickup 9 of the optical disc apparatus 1 is 36.9 mm, which is 0.2 mm closer to the innermost point than is the outermost point (or 37.1 mm). The reference position is also used as an evacuation area to which the optical pickup 9 is evacuated to avoid contact with the optical disc 100 when the optical disc 100 is inserted or ejected.

A read start position, a position to start a pull-in operation of the focus servo and reading from the optical disc 100 inserted is appropriately selected such that it is suitable for the focus servo of DVD and CD.

In reality, a read-in area of CD is located between 1.0 mm and 3.0 mm, while a read-in area of DVD is located between 0.6 mm and 2.0 mm. On the other hand, a recordable DVD, such as DVD-RW, has inside its read-in area Narrow Burst Cutting Area (NBCA) indicating a disc ID for copyright protection. The optical disc apparatus 1 should pass over the NBCA for the focus servo.

Accordingly, the read start position of the optical pickup 9 is set at 2.4 mm, which is inside the read-in area of CD but outside the read-in area of DVD.

In addition to that, the control section 2 includes storage means (not shown), such as a nonvolatile memory, in which the position information of the optical pickup 9 is stored when the optical disc 100 is ejected. The optical disc apparatus 1 then calculates a distance from the current position of the optical pickup 9 to the reference position, and rotates the sled motor 8 a certain number of steps, which is determined by the calculated distance, to bring the optical pickup 9 to the reference position. When the initial operation is started after a new optical disc 100 is inserted the optical pickup 9 is at the reference position because the optical pickup 9 was brought there when the optical disc 100 was ejected. Accordingly, the optical disc apparatus 1 does not have any position detection means to detect the position of the optical pickup 9. In this manner, the optical disc apparatus 1 is downsized and simplified. Even when the optical pickup 9 deviates, due to the shock or the like, from the reference position before the optical disc 100 is inserted, the pull-in process of the focus servo corrects the position of the optical pickup 9 to start the reading process at almost the same position.

However, when the optical disc apparatus 1, not including any position detection means, is purchased by the user, it does not store the position information in the storage means. Accordingly, when the optical disc apparatus 1 is connected to the power supply for the first time after being purchased, it may not be able to detect the current position of the optical pickup 9. Even if the position information of the optical pickup 9 was stored in the storage means during manufacturing process of the apparatus, it may not work: the position information may not indicate the position of the optical pickup 9 accurately if the optical pickup 9 deviates during transportation.

The optical disc apparatus 1 according to an embodiment of the present invention brings, when being connected to the power supply for the first time, the optical pickup 9 to the end of the moving range and then rotates the sled motor 8 (or a stepping motor) a predetermined number of steps to bring the optical pickup 9 to the reference position.

Figure 4B:
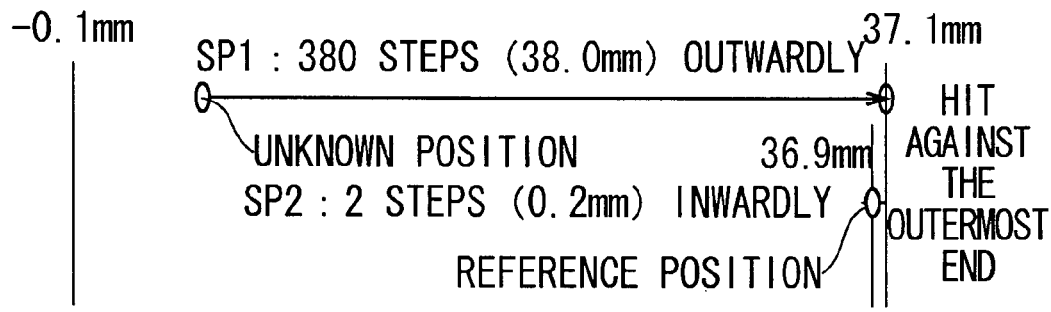
Figure 5:
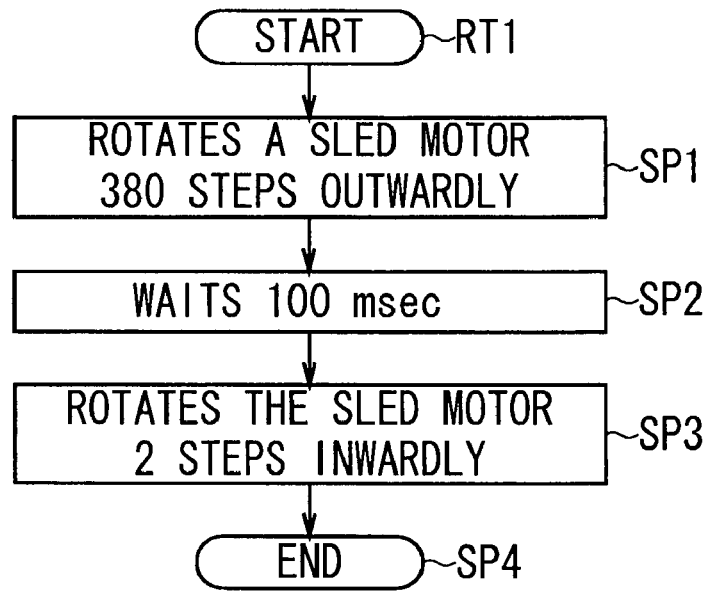
FIG. 5 is a flowchart illustrating a reference position move process which is performed when the apparatus is connected to the power supply.

In the optical disc apparatus 1 according to an embodiment of the present invention, the one-step rotation of the sled motor 8 of the sled drive section 35 moves the optical pickup 9 0.1 mm. The 372 steps move the optical pickup 9 from end to end of the moving range of the optical pickup 9. The control section 2 of the optical pickup apparatus 1 starts a reference position move process (FIG. 5) when it detects to be connected to the power supply for the first time after the optical disc apparatus 1 is shipped. The reference position move process brings the optical pickup 9 to the reference position, as shown in FIG. 4B.

After starting the reference position move process RT1 (FIG. 5) from a start step, the control section 2 of the optical disc apparatus 1 at step SP1 rotates the sled motor 8 counterclockwise 380 steps to bring the optical pickup 9 to the outermost point. The control section 2 at step SP2 waits 100 msec to reduce burden on the sled drive section 35, and then proceeds to next step SP3.

In this manner, the control section 2 rotates the sled motor 8 380 steps even though the 372-step rotation is enough to move the optical pickup 9 from end to end of the moving range. This makes sure that the optical pickup 9 reaches the outermost point. In this case, the sled motor 8 may keep rotating even after the optical pickup 9 reaches the outermost point, but this does not damage the sled drive section 35 and the sled motor 8 because the feed click 34 drops from the feed screw 33.

At step SP3, the control section 2 rotates the sled motor 8 clockwise two steps to move the optical pickup 9 0.2 mm from the outermost point toward the innermost. This places the optical pickup 9 at the reference position. The control section 2 subsequently proceeds to next step SP4 to end the reference position move process.

Because the optical pickup 9 is placed at the reference position, the control section 2 of the optical disc apparatus 1 can appropriately move the optical pickup 9 toward the target position by rotating the sled motor 8 a predetermined number of steps. The control section 2 moves the optical pickup 9 to the reference position again when the user performs a certain operation such as turning-off or disc-ejection operation. The control section 2 then turns off the apparatus or ejects the optical disc 100.

Figure 4C:
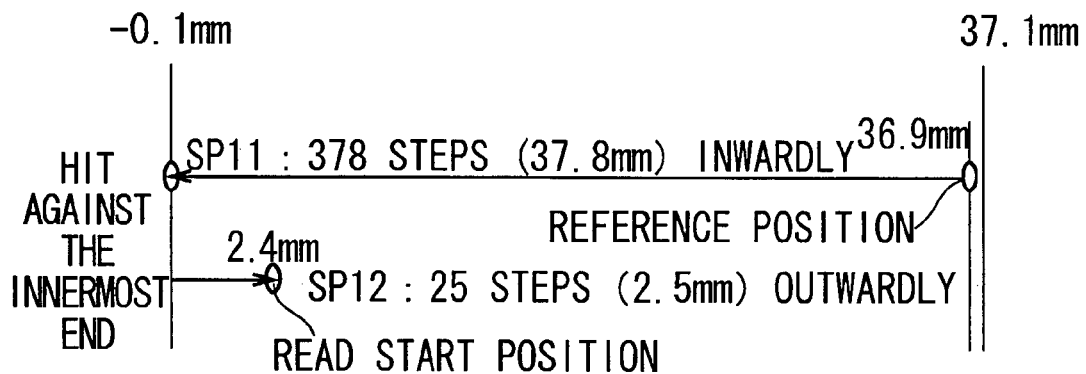
Figure 6:
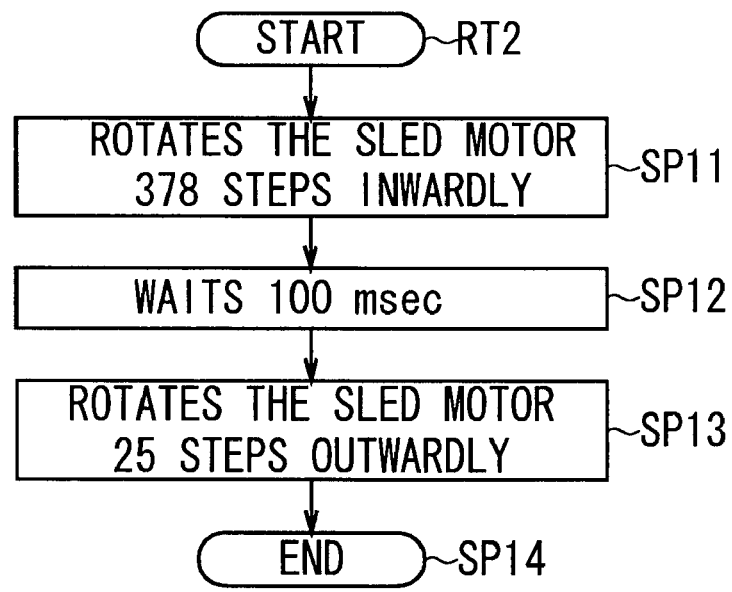
FIG. 6 is a flowchart illustrating a read start position move process which is performed when the disc is inserted.

After that, when detecting that the optical disc 100 is inserted the control section 2 of the optical disc apparatus 1 starts a read start position move process (FIG. 6), to move the optical pickup 9 to the read start position as shown in FIG. 4A. FIG. 4C illustrates the optical pickup 9 moving in accordance with the read start position move process.

After starting the read start position move process RT2 (FIG. 6) from a start step, the control section 2 of the optical disc apparatus 1 at step SP11 rotates the sled motor 8 clockwise 378 steps to bring the optical pickup 9 from the reference position to the innermost point. The control section 2 at step SP12 waits 100 msec to reduce burden on the sled drive section 35, and then proceeds to next step SP13.

At step SP13, the control section 2 rotates the sled motor 8 counterclockwise 25 steps to move the optical pickup 9 2.5 mm from the innermost point toward the outermost. This places the optical pickup 9 at the read start position. The control section 2 subsequently proceeds to next step SP14 to end the read start position move process.

After the optical pickup 9 is placed at the read start position, the control section 2 of the optical disc apparatus 1 performs the pull-in operation of the focus servo and then reads out data from the read-in area.

(3) Operation and Effect

The optical disc apparatus 1 with the above configuration does not recognize the position of the optical pickup 9 when it is connected to the power supply for the first time. The optical disc apparatus 1 brings, when being for the first time connected to the power supply, the optical pickup 9 to the end of the moving range and then rotates the sled motor 8 a predetermined number of steps to place the optical pickup 9 at the reference position.

This allows the optical disc apparatus 1 to omit the position detection means for detecting the position of the optical pickup. Accordingly, the configuration of the apparatus is downsized and simplified.

According to the above configuration, the optical disc apparatus 1 can appropriately control the position of the optical pickup without using the position detection means. Thus, the configuration of the optical disc apparatus 1 that can appropriately record or reproduce information from the optical disc 100 can be simplified and downsized.

(4) Other Embodiments

In the above-noted embodiments, the optical disc apparatus 1 brings, when being for the first time connected to the power supply, the optical pickup 9 to the outermost point of the moving range of the optical pickup 9 and then rotates the sled motor 8 two steps clockwise or inwardly to place the optical pickup 9 at the reference position. However, the present invention is not limited to this. The optical disc apparatus 1 may bring the optical pickup 9 to the innermost point of the moving range and then rotates the sled motor 8 counterclockwise or outwardly a predetermined number of steps to place the optical pickup 9 at the reference position. In this manner, the optical disc apparatus 1 first brings the optical pickup 9 to the physically-determined ends and then moves the optical pickup 9 a predetermined distance to place it at the reference position.

In addition, the reference position may vary according to the moving range of the optical pickup 9, the format of the optical disc 100 or the like. The amount of rotation of the sled motor 8 after the optical pickup has reached the ends may vary according to the reference position.

Moreover, the method according to an embodiment of the present invention is applied to the optical disc apparatus 1 that supports both CD and DVD. In addition to that, the method may be applied to various optical disc apparatus, such as an optical disc apparatus that supports other formats of optical disc or an optical disc apparatus that supports only one of the formats.

The method according to an embodiment of the present invention can be applied to various optical disc apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc apparatus comprising:
   an optical pickup;
   a sled drive section to move the optical pickup in a radial direction of an optical disc, wherein the sled drive section comprises a feed screw to move the optical pickup and a stepping motor to rotate the feed screw; and
   position control means for:
      rotating the stepping motor to move the optical pickup to an end of a moving range of the sled drive section; and
      rotating, subsequent to moving the optical pickup to the end, the stepping motor a predetermined number of steps to move the optical pickup a predetermined distance in an opposite direction to place the optical pickup at a predetermined reference position;
      wherein the predetermined number of steps is determined based upon a distance from the end of the moving range of the sled drive section to the reference position.

2. The optical disc apparatus according to claim 1, wherein when the optical disc apparatus is for the first time connected to an electric power supply, the position control means brings the optical pickup to the end and then moves the optical pickup the predetermined distance in the opposite direction to place the optical pickup at the reference position.

3. The optical disc apparatus according to claim 1, wherein the position control means brings the optical pickup to an outermost end of the moving range of the sled drive section and then moves the optical pickup the predetermined distance inwardly to place the optical pickup at the reference position.

4. A control method of an optical disc apparatus comprising:
   rotating a stepping motor to move an optical pickup in a first direction to an end of a moving range of a sled drive section; and
   rotating, subsequent to moving the optical pickup to the end, the stepping motor a predetermined number of steps to move the optical pickup a predetermined distance in a second direction opposite to the first direction to place the optical pickup at a predetermined reference position;
   wherein the predetermined number of steps is determined based upon a distance from the end of the moving range of the sled drive section to the reference position.

5. An optical disc apparatus comprising:
   an optical pickup;
   a sled drive section to move the optical pickup in a radial direction of an optical disc, wherein the sled drive section comprises a feed screw to move the optical pickup and a stepping motor to rotate the feed screw; and
   a position control section configured to:
      rotate the stepping motor to move the optical pickup to an end of a moving range of the sled drive section; and
      rotate, subsequent to moving the optical pickup to the end, the stepping motor a predetermined number of steps to move the optical pickup a predetermined distance in an opposite direction to place the optical pickup at a predetermined reference position;
      wherein the predetermined number of steps is determined based upon a distance from the end of the moving range of the sled drive section to the reference position.

6. The optical disc apparatus according to claim 1, wherein rotating, subsequent to moving the optical pickup to the end, the stepping motor a predetermined number of steps comprises waiting a predetermined amount of time after the optical pickup has reached the end prior to rotating the stepping motor the predetermined number of steps.

7. The control method according to claim 4, further comprising:
   waiting a predetermined amount of time after the optical pickup has reached the end prior to rotating the stepping motor the predetermined number of steps.

8. The optical disc apparatus according to claim 5, wherein the position control section is further configured to:
   wait a predetermined amount of time after the optical pickup has reached the end prior to rotating the stepping motor the predetermined number of steps.

* * * * *